May 30, 1933.  S. B. HASELTINE  1,911,954
HAND BRAKE
Filed Feb. 9, 1931
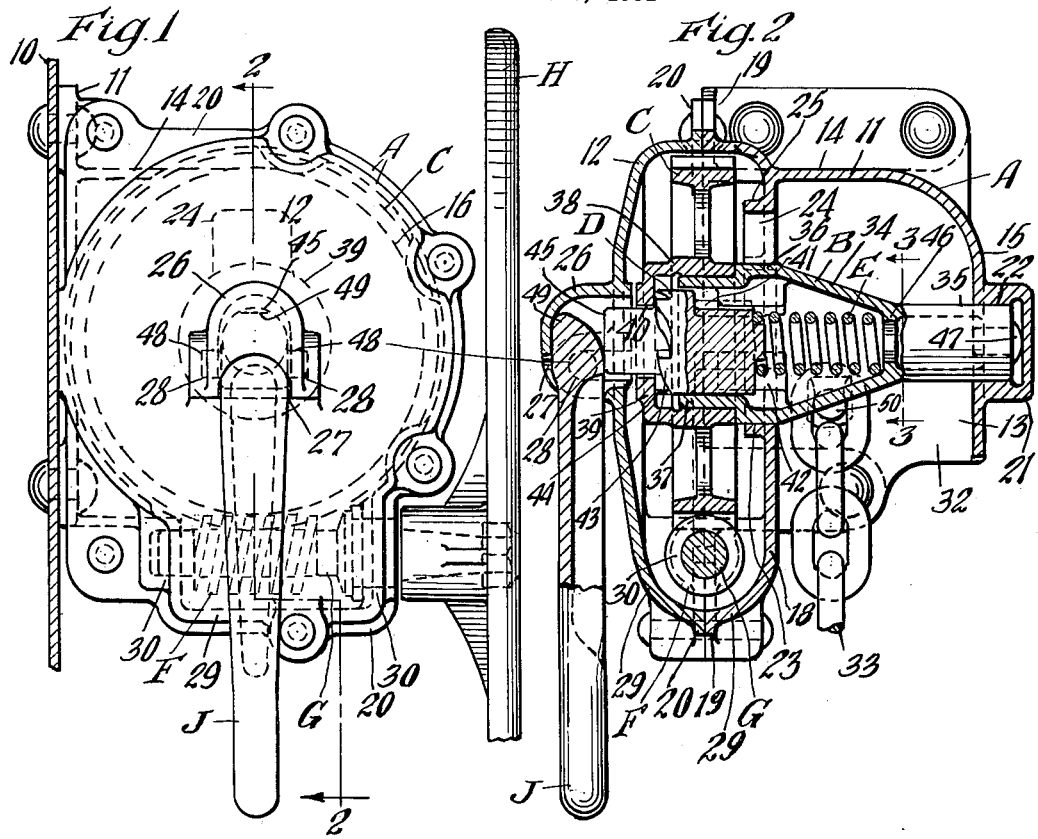
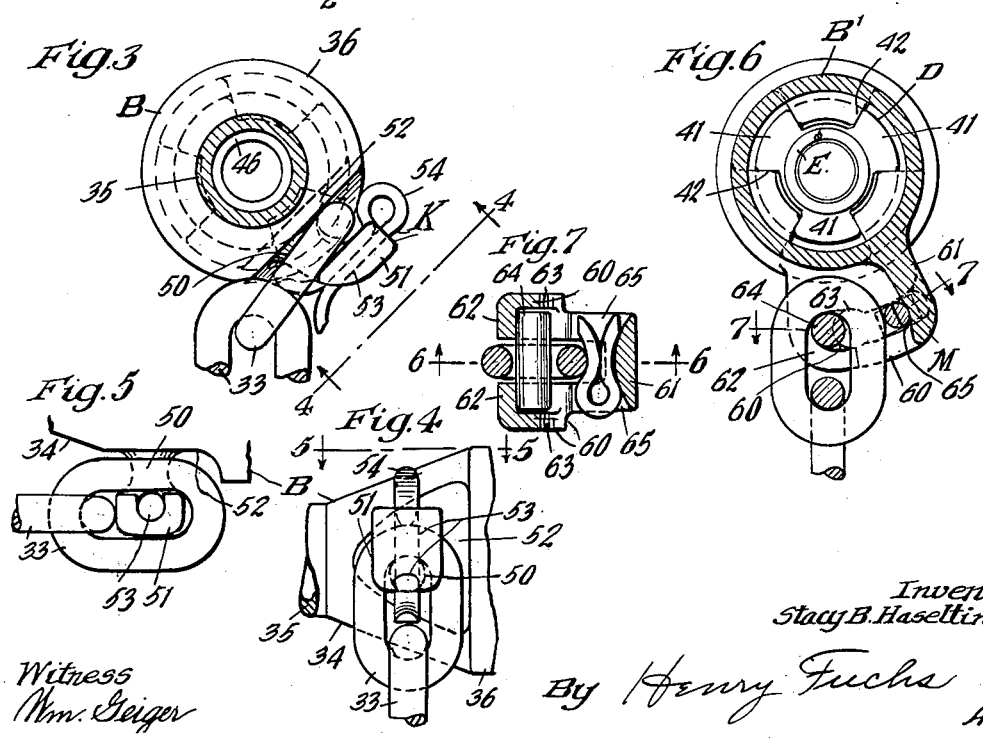
Witness
Wm. Geiger
Inventor
Stacy B. Haseltine
By Henry Fuchs
Atty.

Patented May 30, 1933

1,911,954

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

HAND BRAKE

Application filed February 9, 1931. Serial No. 514,465.

This invention relates to improvements in hand brakes.

One object of the invention is to provide a simple and efficient hand brake mechanism of the power-multiplying type, especially adapted for railway cars, including a chain winding drum operated by power-multiplying gearing comprising cooperating worm and worm wheel members, and wherein releasable means is provided for operatively connecting the worm wheel and worm, including a sliding clutch member rotatable with the drum and cooperating with clutch teeth for the worm wheel, release of the clutch means permitting free rotation of the drum in release of the brakes without imparting any movement to the actuating, power-multiplying gearing and the means for operating the same.

Another object of the invention is to provide a hand brake mechanism for railway cars, including a chain winding drum rotatable about a horizontal axis; power-multiplying gearing comprising a worm and worm wheel; releasable clutch means operatively connecting the worm wheel and drum; and means for actuating the worm member comprising a horizontally disposed operating shaft to which the worm is fixed, wherein all of the parts are enclosed and operatively mounted within a two part housing divided along a vertical plane, each section of the housing having part bearing means thereon, said part bearing means together forming complete bearing supports for the operating shaft.

A further object of the invention is to provide in a hand brake mechanism including a rotary chain winding drum, simple, efficient and reliable means of rugged design for securing the brake chain to the drum.

A still further object of the invention is to provide securing means for the brake chain, of the character specified in the preceding paragraph, comprising an anchoring member on the chain winding drum with which the end link of the chain is engaged, wherein the anchoring member is engaged through said end link and directly takes the load, and detachable holding means is provided for restricting movement of said link to maintain the same in cooperative relation with said anchoring member, without subjecting said holding means to any strain due to the tension on the brake chain during the application of the brakes.

Still another object of the invention is to provide a hand brake mechanism including a chain winding drum rotatable about a horizontal axis; a worm wheel connected to the drum for rotating the same; a hand wheel actuated operating shaft rotatable about an axis at right angles to the axis of rotation of the drum; a worm member fixed to said shaft and operatively engaged with the worm wheel; and a two part housing enclosing the parts, said housing being divided on a vertical plane and the two sections thereof comprising a main body portion and a cover member, said members when secured together providing bearing means for all of the parts and holding the parts assembled, said cover member having the outer wall thereof forming one of the side walls of the housing, said main body portion having a partition wall dividing the same into two compartments, said partition wall being in a plane parallel to the opposite side walls of the housing and supporting bearing means for all of the parts of the mechanism being provided on the two sections of the housing, comprising bearing members formed on the partition wall and opposed side wall of the main body portion, rotatably supporting the chain winding drum, and split bearing members comprising half bearings formed on the meeting portions of the main body and cover members of the housing for rotatably supporting the operating shaft, and wherein the worm wheel is journaled on a bearing member provided on that end of the chain winding drum, which is journaled in the partition wall, and endwise movement of the worm wheel is prevented by engagement of the outer end of the hub thereof with the cover member of the housing.

Other objects of the invention will move clearly appear from the description and claims hereinafter following.

In the drawing, forming a part of this specification, Figure 1 is a side, elevational view of my improved hand brake mechanism, illustrating the same as mounted on the end wall of a railway car. Figure 2 is a vertical, sectional view, corresponding to the line 2—2 of Figure 1. Figure 3 is a transverse, vertical, sectional view through a portion of the chain winding drum, corresponding to the line 3—3 of Figure 2 and illustrating the means for anchoring the brake chain to the drum. Figure 4 is a plan view of the chain anchoring means shown in Figure 3, looking upwardly from one side, as indicated by the arrows 4—4 in Figure 3. Figure 5 is an end elevational view of the parts shown in Figure 4, looking downwardly from the top of said figure, as indicated by the arrows 5—5 the chain links being shown in a position different from that in Figures 3 and 4. Figure 6 illustrates another embodiment of the chain anchoring means, the same being a vertical, sectional view on a plane transverse of the axis of rotation of the drum, and corresponding substantially to the line 6—6 of Figure 7. And Figure 7 is a sectional view, corresponding to the line 7—7 of Figure 6.

Referring first to the embodiment of the invention illustrated in Figures 1 to 5 inclusive, the improved hand brake mechanism is illustrated as mounted on the end wall of a railway car, said end wall being designated by 10. My improved brake mechanism includes broadly a housing A, which encloses the operating parts; a chain winding drum B; a worm wheel C; a sliding clutch member D; a clutch spring E; a worm member F; an operating shaft G on which the worm member F is fixed; a hand wheel H connected to the operating shaft; a clutch actuating lever J; and a chain anchoring means K on the drum B.

The housing A is of two part construction, as clearly illustrated in Figures 1 and 2, comprising a main body portion 11 and a dished cover member 12, the parts being divided along a vertical plane. The main body portion 11 of the housing is defined by a back wall 13, a top wall 14 and a side wall 15. The side wall 15 has the upper portion thereof curved, as clearly shown in Figure 2, and merges with the top wall 14. The back wall 13 extends above the top wall 14, as clearly shown in Figure 2, thereby providing a securing flange adapted to receive rivets for fixing the housing to the end wall 10 of the car, as clearly illustrated in Figures 1 and 2. As shown, two rivets are employed, which extend through this flanged portion. A third rivet member or other securing element is secured at the bottom of the main body portion of the housing to secure the same to the end wall 10, said rivet extending through a lower offset section on said housing wall, as shown in Figure 2. The main body portion of the housing is also provided with a curved front wall section 16, which forms a continuation of the top wall 14. The housing section 11 also has a transverse partition wall 18, which is spaced from and substantially parallel to the side wall 15. To the left of the wall 18, as shown in Figure 2, the housing portion 11 is enlarged and is of substantially cylindrical outline, as shown in Figures 1 and 2. Said enlarged portion is provided with a peripheral flange 19, which cooperates with a similar peripheral flange 20 on the cover section 12. The flanges 19 and 20 may be secured together by any suitable means and as herein shown are riveted to each other. The side wall 15 of the section 11 is provided with an outstanding boss 21 having a bearing opening or seat 22, which receives the corresponding end of the chain winding drum B. The partition wall 18 is provided with a bearing opening 23 in axial alinement with the bearing opening 22, but of larger diameter. At the top, the wall 18 is recessed, as shown at 24, thereby providing a clearance opening communicating with the opening 23, for a purpose hereinafter pointed out. As shown, the openings 23 and 24 are continuous and are reinforced by a continuous laterally outstanding flange 25, which at the bottom section of the opening forms a bearing support for bearing means on the drum B, as hereinafter pointed out. The cover member 12, which forms the side wall of the housing opposed to the wall 15, also has an outwardly offset hollow boss 26 centrally thereof, which accommodates the inner end of the clutch actuating lever J, said boss being open at the bottom, as indicated at 27, to accommodate the lever and having interior bearing seats 28—28 in the form of inwardly opening horizontal slots on the opposed side walls thereof for mounting the lever J. Both the cover section 12 and the main body portion are offset at the bottom, as indicated at 29, to accommodate the operating shaft G and the worm member F. The meeting faces of the offset portions of the sections 11 and 12 of the housing are provided with spaced half bearing members 30—30, which embrace the operating shaft when the sections of the housing are secured together and form complete bearing means therefor at opposite ends of the worm member F. The main body portion of the housing is open at the bottom, as indicated at 32, to accommodate the brake chain for movement. The chain which is operatively connected to the brake mechanism proper of the car, is indicated by 33 and extends through the opening 32 and has the end link thereof anchored to the drum B, as hereinafter pointed out.

The chain winding drum B is of hollow construction, as clearly shown in Figure 2, and has the chain winding section 34 thereof of conical form. At the right-hand end, as viewed in Figure 2, the chain winding drum is provided with a cylindrical bearing portion 35, which is journaled in the bearing opening 22. At the larger end of the conical winding section 34, the drum is provided with a cylindrical bearing portion 36, which is of larger diameter than the winding section and corresponds in size to the journal opening 23 of the partition wall 18 and is accommodated in said opening. To the left of the partition wall 18, as viewed in Figure 2, the drum is provided with a sleeve-like cylindrical extension 37, which projects beyond the bearing member 23 and is of slightly less diameter than the bearing portion 36. The cylindrical bearing sleeve section 37 serves to support the worm wheel C for rotary movement on the chain winding drum.

The worm wheel C, which is accommodated between the partition wall 18 and the end wall formed by the cover member 12 has a hollow hub portion 38, which is journaled on the sleeve-like section 37 of the drum. As shown, the sleeve-like section 37 extends a considerable distance into the hub 38, thereby adequately supporting the worm wheel. The hub member 38 is closed at the lefthand end, as viewed in Figure 2, said closed section providing an end wall 39 adapted to abut the wall formed by the cover plate 12, to restrict endwise movement of the worm wheel on the bearing member of the chain winding drum, thereby holding the same in proper assembled relation therewith. The wall 39 of the hub member of the worm wheel C is provided with an axial opening 40 for a purpose hereinafter pointed out.

The sliding clutch member D is telescoped within the hollow section of the chain winding drum B, said telescoped portion being provided with relatively wide radial ribs 41—41, which slidably engage within grooves 42—42 provided interiorly of the drum member. As will be evident, the clutch member D is thus mounted for sliding movement with respect to the drum B, but is compelled to rotate in unison therewith. The clutch member D is provided with a clutch section proper, having an annular series of laterally extending clutch teeth 43—43, which cooperate with interior clutch teeth 44 provided on the hub member of the worm wheel C, said clutch teeth being formed on the wall 39 and projecting laterally therefrom. To the left of the clutch section of the member D, the same is provided with a shank portion 45 which projects through the opening in the wall 39 and extends into the hollow boss member 26. The spring E is interposed between the clutch member D and an abutment wall 46 formed on the drum B at the righthand end of the conical section thereof. At the extreme righthand end, the drum is provided with a thrust member 47 in the form of a rivet seated in an opening in the bearing section 35 and having the rounded projecting head thereof bearing on the closed end wall of the boss 21.

The worm member F is formed integral with the operating shaft G, which is journaled in the part bearing members 30—30 of the two housing sections, as hereinbefore described. The operating shaft has the axis of rotation thereof disposed horizontally and at right angles to the axis of rotation of the chain winding drum, the worm F being disposed below the worm wheel C and in meshing relation therewith. The operating shaft G projects outwardly of the housing, as clearly shown in Figure 1, and has the hand wheel H secured to said projecting end.

The clutch actuating lever J has trunnion means 48—48 at the inner end thereof, which is preferably formed integral therewith and journaled in the bearing openings or slots 28—28 of the boss 26. At the pivoted end, the lever J is provided with a cam head 49 which cooperates with the projecting stem or shank portion of the clutch member D so that when the lever is raised, the clutch will be forced to the right, as viewed in Figure 2, against the resistance of the spring E, thereby disengaging the clutch teeth thereof from the teeth of the worm wheel C. As will be evident, when the lever is released and assumes the pendant position shown in Figure 2, the spring E will return the clutch to operative engaging position. In assembling the lever J with the housing the same is entered through the hollow boss 26 of the cover member C from the inner side thereof, the hand grip end of the lever being the first part thereof inserted. Upon passing the head end of the lever into the hollow boss, the trunnions 48—48 of the same will be operatively engaged within the slots 28—28 at the opposite sides of the boss 26. When the parts have been fully assembled and the cover riveted to the main body portion of the housing, the expansive action of the clutch spring E will hold the trunnions of the lever J at the outer ends of the slots 28—28.

The chain anchoring means K, as most clearly shown in Figures 3, 4 and 5, is in the form of a hook having a shank portion 50 and an angularly extending terminal portion 51, the terminal portion 51 being of the outline as shown in Figure 3 and of greater width than the spacing between the side members of the end link of the chain, as clearly shown in Figures 4 and 5. The chain winding drum B has an inwardly offset portion 52 from which the shank of the hook K extends, said offset portion presenting a flat outer surface, as shown in Figure 3. The section 51 of the hook is provided with an opening 53 extending lengthwise thereof, adapted to receive a cotter pin 54. In the normal position of the parts, the end link is engaged over the shank portion of the hook, as clearly shown in Figures 3 and 4. In this position, the cotter pin 54, the inner leg of which engages within the opening of the link, prevents rotation of the end link about the axis of the shank 50.

In attaching the chain to the hook member K, the end link is placed in the full line position shown in Figure 5, the cotter pin at this time being removed. In this position, the end link is passed over the section 51 and inwardly over the shank 50 and is then rotated about the axis of the shank to the full line position shown in Figure 4. As will be evident, in this position disengagement of the link is prevented by the overhanging ledges formed by the relatively wide section 51 of the hook. The cotter pin is then inserted and engaged with the end link, as shown in Figure 3, the legs of the pin being spread apart. Inasmuch as one of the legs engages within the opening of the end link, the same will be held against rotation about the shank of the hook, thereby preventing bringing the link to a position at right angles to that shown in Figure 4, in which position it may pass over the section 51 of the hook. It is further pointed out that in case the inwardly extending leg of the cotter pin 54 is accidentally broken off, and even though the link may turn when this is the case, the remaining sections of the cotter pin will prevent the link from passing over the part 51 of the hook. In removing the chain, the cotter pin is first detached, the end link is then rotated to a position at right angles to that shown in Figure 4, whereupon the same may be passed over the end portion 51 of the hook and disengaged entirely from the same.

The operation of my improved hand brake mechanism, as illustrated in the embodiment shown in Figures 1 to 5 inclusive, is as follows: In a chain tightening operation, the hand wheel H is rotated, thereby actuating the worm and causing rotation of the chain winding drum through the worm wheel C, which at such time is operatively connected to the drum by means of the clutch D. In order to release the brakes quickly, the lever J is raised, thereby forcing the clutch member to the right, as viewed in Figure 2, and disengaging the same from the worm wheel C, thus permitting free rotation of the chain winding drum without imparting any movement to the gearing or the operating hand wheel H. In backing up the brakes, the clutch is left in engaged position and the hand wheel is rotated backwardly.

Referring next to the embodiment of the invention illustrated in Figures 6 and 7, the general arrangement and construction of the hand brake is precisely the same as that shown in Figures 1 to 5 inclusive, with the exception that a different form of chain attaching means is employed. In Figure 6, the drum is indicated by B' and the chain anchoring means by M. This anchoring means comprises an outstanding section on the drum member having spaced side walls 60—60, an end wall 61 and inwardly extending flange sections 62—62 on said side walls and opposed to the end wall 61. A pocket is thus provided, adapted to accommodate the end link of the chain. The side walls 60—60 are provided with recesses 63—63 through which a retaining pin may be inserted. The recesses 63—63 are offset with respect to the flanges 62—62, thereby providing shoulders adapted to limit the movement of the pin, which are spaced from the recesses 63—63. The retaining pin, which is indicated by 64, is engaged through the end link and is held against outward movement by the walls 60—60, which embrace the same. As will be evident, the pin may be inserted through the link when the opening in the link is brought into alinement with the openings 63—63. The link, with the pin extending therethrough, is then displaced to the left, as viewed in Figures 6 and 7 so as to bring the pin out of alinement with the openings 63—63. In order to maintain the link of the chain in this position, a cotter pin is employed, which is inserted between the link and the end wall 61 of the casting. As shown in Figure 6, the cotter pin extends through slots 65—65 provided in the side walls of said outstanding lug casting. In order to detach the chain, the cotter pin is removed and the link, together with the pin 64, is moved to the right, as viewed in Figure 6, so as to bring the pin in alinement with the recesses 63—63, whereupon the pin may be readily forced out of the link and the chain detached.

In assembling my improved hand brake mechanism, as shown in Figures 1 and 2, the chain winding drum with the clutch and the clutch spring disposed therein, and the worm wheel C seated on the bearing portion at the end of the drum, is placed within the housing section 11, while the cover member is detached, the bearing 35 and the chain winding drum section 34 being inserted through the opening 23 in the partition wall of said housing section and the bearing 35 engaged within the bearing member 22. As will be evident, the recessed portion 24 of the partition wall provides clearance for the passage of the chain engaging lug or hook on the drum while assembling the parts. The worm and worm shaft G are then placed in the half bearing sections of the housing portion 11 and the cover plate with the lever J mounted therein is then attached and riveted to the section 11. The parts are thus all held in position by the assembled housing and the housing provides all necessary bearing means for the rotary elements. The chain 33 is then attached in the manner hereinbefore described.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a two-part housing, including a cover member and a main body portion, said cover member having inwardly opening bearing slots therein; a rotary chain-winding drum within the housing; means for actuating the drum to wind the chain thereon; clutch means for operatively connecting said last named means and the drum; a spring for yieldingly maintaining said clutch means engaged; and an operating lever for actuating the clutch, said operating lever having trunnions engaged and swiveled within the slots of the cover member, said trunnions being held assembled within said bearing slots and in operative bearing engagement therewith by the action of the spring on said clutch means.

2. In a clutch means for hand brake mechanisms including a rotary driving gear member and a rotary chain-tightening member having exterior cylindrical bearing portions at opposite ends by which it is rotatably mounted, said chain-tightening member being hollow and having spaced interior lugs thereon circumferentially arranged, the combination with a clutch element supported entirely by said member and slidable axially within said hollow portion of said chain-tightening member, said clutch element having a plurality of radial lugs in shouldered engagement with said lugs of the chain-tightening member, whereby said element and chain-tightening member are rotatable in unison; of a clutch head rigid with said element and normally projecting outwardly of the member by which the clutch is supported, said clutch head and rotary driving member having cooperating clutch teeth thereon; a spring yieldingly holding said clutch head engaged with said driving member; and manually operated lever means for sliding said clutch element lengthwise of said members against the resistance of the spring to disengage the clutch head and permit relative rotation of said members.

3. In a clutch means for hand brake mechanisms including a rotary actuating member and a rotary chain-winding member, said members being coaxial and having aligned openings, one of said members having spaced, cylindrical, exterior journal portions by which it is rotatably supported, the combination with a clutch element supported entirely by said last named member, said element being headed at one end and having a stem slidable within the opening of said last named member, said stem having a plurality of spaced, longitudinally extending shoulders engaging similar interior shoulders on the member with which it has sliding engagement, said clutch head and the other member having cooperating clutch projections; means for yieldingly holding said clutch head engaged with the last named member; and manually-operated means for sliding said clutch element to disengage the clutch projections of the head from the cooperating clutch projections to release the clutch and allow relative rotation of said members.

4. In a hand brake mechanism, the combination with a two-part housing comprising a main body section and a cover member, said housing being divided into two compartments by a transverse partition wall located in a plane substantially parallel to the plane of the cover portion; of a chain-winding drum having journal members at opposite ends thereof and a winding section between said journal members, one of said journal members being of larger diameter than both said winding section and the journal member at the other end of the drum; a rigid anchoring member projecting from the winding section of the drum to which the brake chain is anchored; a journal opening in said partition wall within which the journal portion of larger diameter is journaled, said journal opening being enlarged at one side to provide clearance for the anchoring member in assembling the drum and housing; a journal bearing on said main body portion of the housing within which the journal member at the opposite end of the drum is rotatable; power multiplying worm gearing for actuating said drum; a rotary operating shaft rotatable about a horizontal axis at right angles to the axis of rotation of said drum and having a member of said worm gearing rotatable therewith; spaced half bearing members on the cover member of the housing; spaced half bearing members on said main body part of the housing opposed to and registering respectively with said spaced bearings of the cover member and forming therewith complete spaced bearing members, each embracing said operating shaft and rotatably supporting the same; and manually-operated means for actuating said shaft.

In witness that I claim the foregoing I have hereunto subscribed my name this 6th day of February 1931.

STACY B. HASELTINE.